US011933255B2

(12) United States Patent
Yamaguchi

(10) Patent No.: US 11,933,255 B2
(45) Date of Patent: Mar. 19, 2024

(54) INTAKE MANIFOLD

(71) Applicant: TOYOTA JIDOSHA KABUSHIKI KAISHA, Toyota (JP)

(72) Inventor: Takuma Yamaguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/332,797

(22) Filed: Jun. 12, 2023

(65) Prior Publication Data

US 2023/0407825 A1 Dec. 21, 2023

(30) Foreign Application Priority Data

Jun. 21, 2022 (JP) ................................ 2022-099586

(51) Int. Cl.
*F02M 35/10* (2006.01)
*F02M 35/104* (2006.01)

(52) U.S. Cl.
CPC .... *F02M 35/104* (2013.01); *F02M 35/10354* (2013.01)

(58) Field of Classification Search
CPC ........... F02M 35/104; F02M 35/10354; F02M 35/10039; F02M 35/1165; F02M 35/10144
See application file for complete search history.

(56) References Cited

U.S. PATENT DOCUMENTS

| | | | | |
|---|---|---|---|---|
| 2009/0133659 A1* | 5/2009 | Iwata | ............... | F02M 35/10144 123/184.61 |
| 2018/0156166 A1* | 6/2018 | Mizoguchi | ....... | F02M 35/10026 |
| 2018/0363600 A1* | 12/2018 | Yamaguchi | ...... | F02M 35/10144 |

FOREIGN PATENT DOCUMENTS

| | | |
|---|---|---|
| JP | 3960101 B2 | 8/2007 |
| JP | 5814106 B2 | 11/2015 |
| JP | 2017-67044 A | 4/2017 |

* cited by examiner

*Primary Examiner* — Syed O Hasan
(74) *Attorney, Agent, or Firm* — Oblon, McClelland, Maier & Neustadt, L.L.P.

(57) ABSTRACT

A first piece forms a part of a surge tank. A second piece forms the surge tank together with the first piece. The first piece includes an introduction hole through which blow-by gas is introduced. The first piece includes a first flange fixed to the second piece. The second piece includes a second flange fixed to the first flange. A cover is located inside the surge tank. The cover defines, together with an inner surface of the surge tank, a gas passage extending from the introduction hole into the branch pipe. A part of the cover is sandwiched between the first flange and the second flange.

2 Claims, 5 Drawing Sheets

INTAKE MANIFOLD

BACKGROUND

1. Field

The present disclosure relates to an intake manifold.

2. Description of Related Art

Japanese Patent No. 3960101 discloses an intake manifold. The intake manifold includes a surge tank and branch pipes. The surge tank is a part of the intake passage. Each branch pipe extends from the surge tank. Each branch pipe leads the intake passage to a corresponding cylinder.

The intake manifold includes a first piece, a second piece, and a cover. The first piece has an inlet port through which intake air is drawn into the surge tank and an introduction hole through which blow-by gas is introduced. The second piece is welded to the first piece. The second piece forms a surge tank together with the first piece. The second piece includes the branch pipes and an outlet hole that leads the blow-by gas to the branch pipes. The cover defines a passage for blow-by gas together with an inner wall of the surge tank. The blow-by gas introduced from the introduction hole of the first piece flows to the outlet hole of the second piece through the passage defined by the cover.

In the intake manifold disclosed in Japanese Patent No. 3960101, the cover is integrally molded with the first piece. Thus, a complicated process may be required for molding the first piece and the cover, and limits may be imposed on designing the shape of the first piece and the cover.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present disclosure provides an intake manifold that includes a surge tank that is a part of an intake passage and branch pipes branched from the surge tank and respectively connected to intake ports of an internal combustion engine. The intake manifold includes a first piece made of resin, forming a part of the surge tank, a second piece made of resin, forming the surge tank together with the first piece, and a cover made of resin and located inside the surge tank. The first piece includes an inlet port through which intake air is introduced into the surge tank, an introduction hole through which blow-by gas is introduced, and a first flange fixed to the second piece. The second piece includes a second flange fixed to the first flange. The cover defines, together with an inner surface of the surge tank, a gas passage extending from the introduction hole into the branch pipe. A part of the cover is sandwiched between the first flange and the second flange.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

An embodiment of an intake manifold 10 for an internal combustion engine will now be described with reference to the drawings.

Entire Configuration

Figure 1:
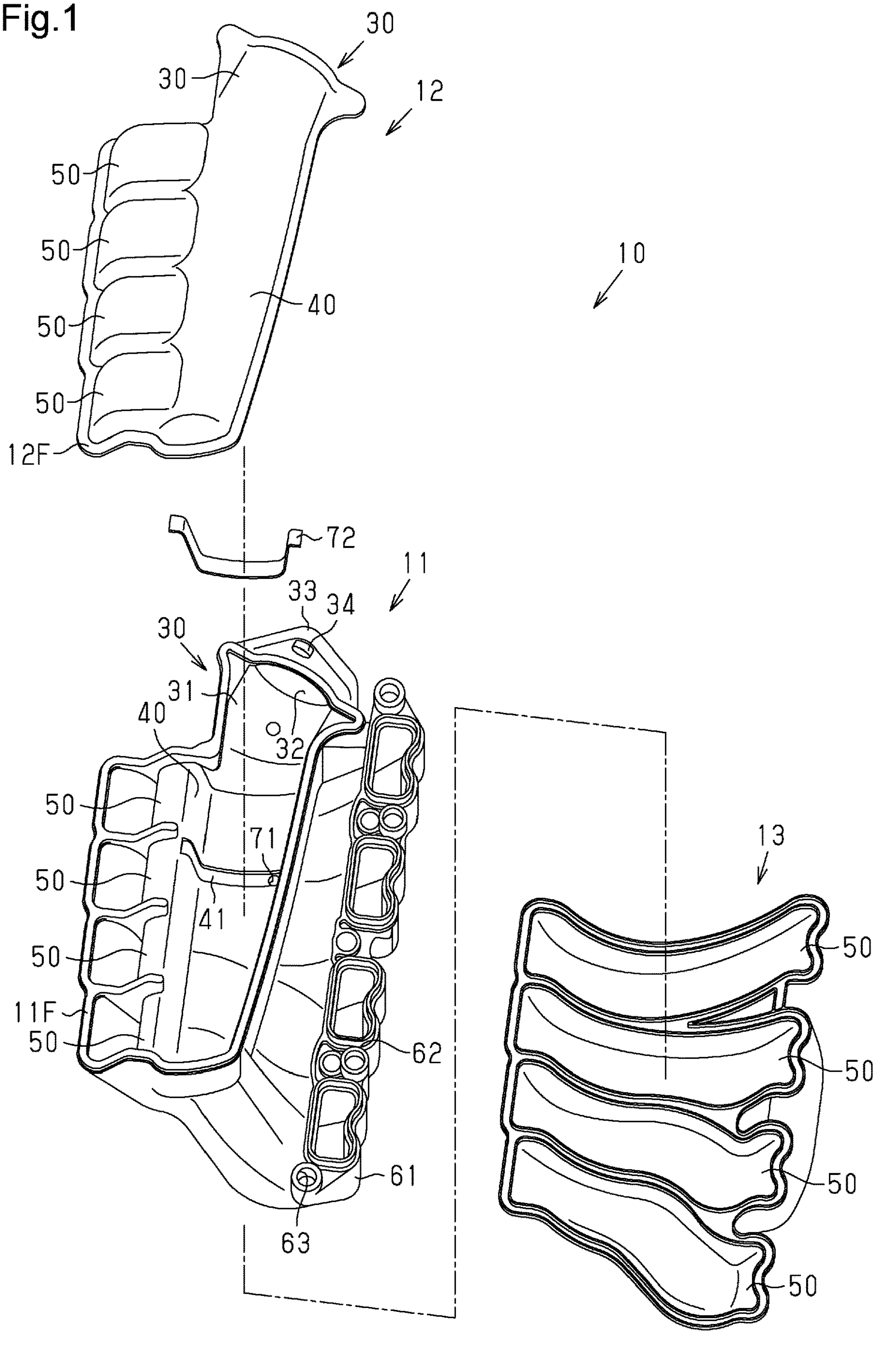
FIG. 1 is an exploded perspective view showing an intake manifold according to an embodiment.

As shown in FIG. 1, the intake manifold 10 includes an intake pipe 30 that draws in air from the outside of a vehicle. The intake pipe 30 includes a main body 31 and an upstream flange 33. The main body 31 has a substantially cylindrical shape. The main body 31 has an inlet port 32 through which intake air is introduced into a surge tank 40, which will be described later.

The upstream flange 33 protrudes from an outer surface of the main body 31. The upstream flange 33 is located at an end of the main body 31 near the inlet port 32. The upstream flange 33 has bolt holes 34. Each bolt hole 34 extends through the upstream flange 33. A cylindrical throttle body (not shown) is fixed to the intake manifold 10 by inserting a bolt into the bolt hole 34. The throttle body accommodates a throttle valve used to adjust an intake air amount. That is, intake air from the outside of the vehicle passes through the throttle body and flows into the intake manifold 10 through the inlet port 32 of the intake pipe 30.

The intake manifold 10 includes the surge tank 40. The surge tank 40 is a part of an intake passage of the internal combustion engine. The surge tank 40 suppresses intake pulsation. The surge tank 40 is connected to an end of the main body 31 opposite to the inlet port 32. The entire surge tank 40 has a cylindrical shape. The surge tank 40 extends in a longitudinal direction of the main body 31.

The intake manifold 10 includes four branch pipes 50. The branch pipes 50 are arranged in the longitudinal direction of the surge tank 40. Each branch pipe 50 extends in a curved manner along a side surface of the surge tank 40 to surround the surge tank 40.

The intake manifold 10 includes a downstream flange 61. The downstream flange 61 protrudes outward from the outer surface of each branch pipe 50. The downstream flange 61 connects between the four branch pipes 50. The downstream flange 61 is located at an end of each branch pipe 50 on a side opposite to the surge tank 40.

The downstream flange 61 includes gasket grooves 62 and bolt holes 63. Each gasket groove 62 is recessed in an end face of the downstream flange 61. Further, each gasket groove 62 surrounds the opening of each branch pipe 50. When the intake manifold 10 is connected to the intake port of the internal combustion engine, a gasket (not shown) is fitted into the gasket groove 62. The gasket ensures sealability between the intake manifold 10 and the intake port. Each bolt hole 63 extends through the downstream flange 61. The intake manifold 10 is fixed to the internal combustion engine by inserting a bolt into the bolt hole 63. As a result, the branch pipes 50 branch from the surge tank 40 and are respectively connected to the intake ports of the internal combustion engine. In the drawings, only some of the gasket grooves 62 and some of the bolt holes 63 are denoted by reference numerals.

Figure 2:
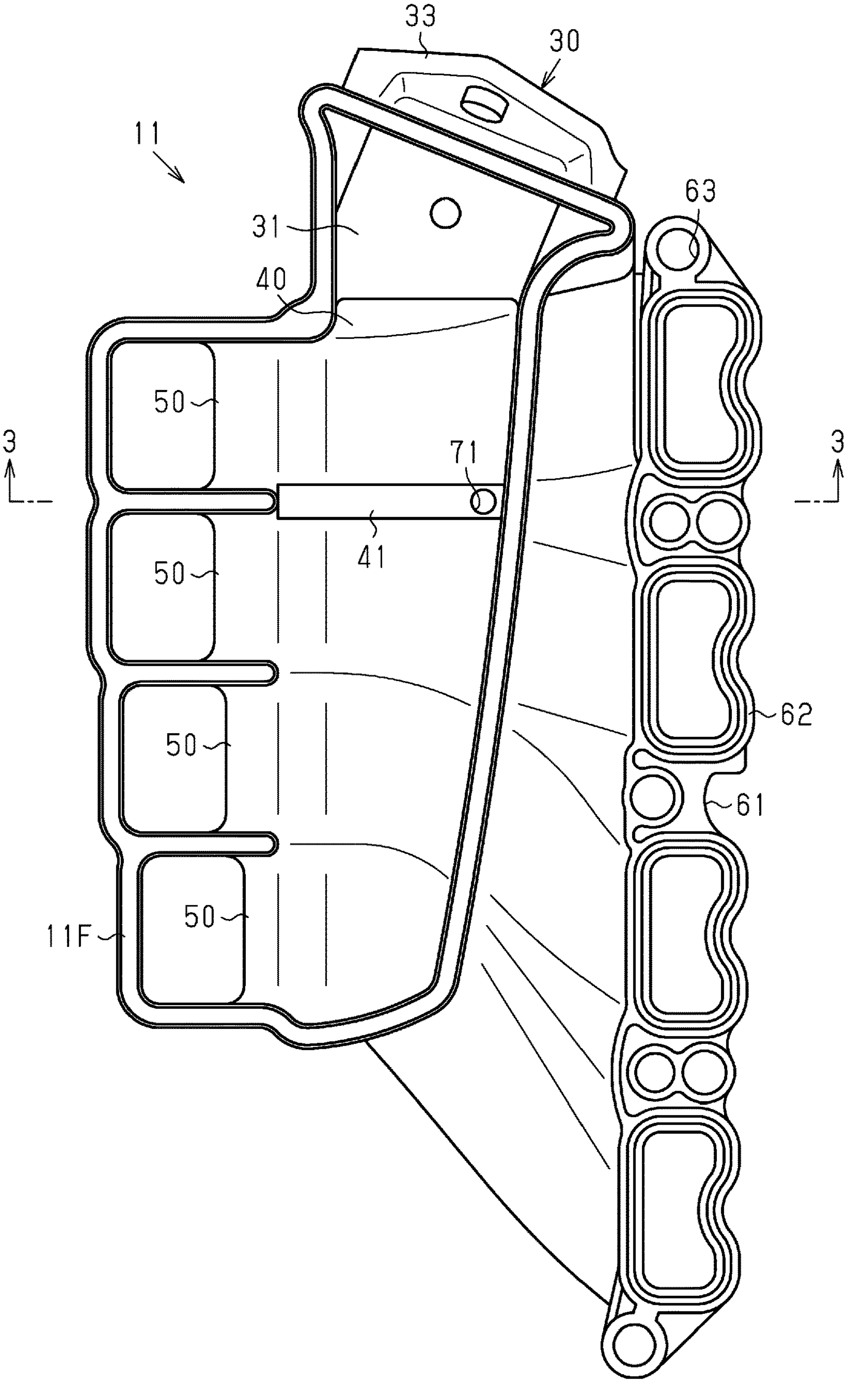
FIG. 2 is a plan view showing the first piece of the embodiment.
Figure 3:
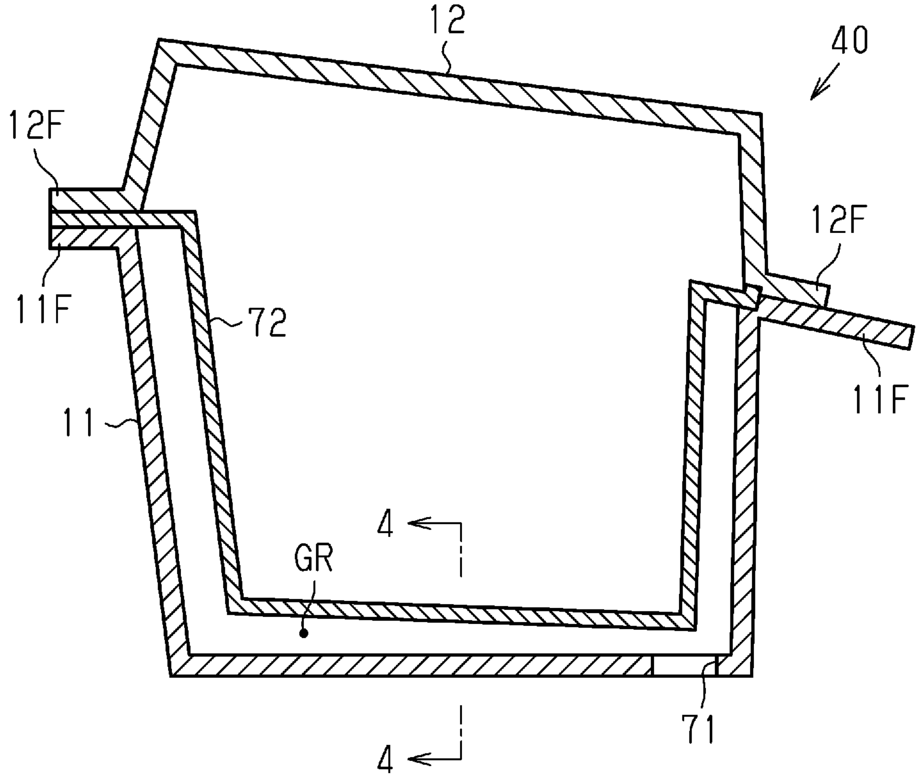
FIG. 3 is a partial cross-sectional view showing the intake manifold taken along line 3-3 of FIG. 2.

As shown in FIG. 2, the intake manifold 10 includes an introduction hole 71 through which blow-by gas is introduced into the surge tank 40. As shown in FIG. 3, the introduction hole 71 extends through the surge tank 40. The introduction hole 71 is connected to a blow-by gas passage (not shown).

Further, as shown in FIG. 1, the intake manifold 10 includes a cover 72. The cover 72 is located inside the surge tank 40. As shown in FIG. 3, the cover 72 defines, together with the inner surface of the surge tank 40, a gas passage GR extending from the introduction hole 71 toward the branch pipes 50 (i.e., leftward in FIG. 3).

Figure 4:
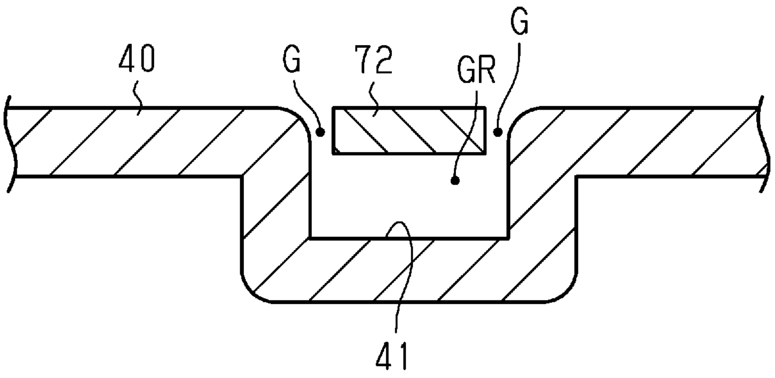
FIG. 4 is a partial cross-sectional view showing the intake manifold taken along line 4-4 of FIG. 3.

As shown in FIG. 4, a portion of the inner surface of the surge tank 40 that defines the gas passage GR is a groove 41. The groove 41 is recessed on a side opposite to the cover 72 from the other portions. As shown in FIG. 2, the groove 41 is generally located between one of the branch pipes 50 that is closest to the inlet port 32 and a branch pipe 50 adjacent to that branch pipe 50. The groove 41 is elongated in a direction orthogonal to an axis along which the four branch pipes 50 are arranged.

As shown in FIG. 1, the cover 72 has a plate shape. In the inner surface of the surge tank 40, the cover 72 faces an inner surface of the groove 41. As shown in FIG. 4, the cover 72 is substantially flush with a portion of the inner surface of the surge tank 40 other than the groove 41. That is, the cover 72 does not protrude from the inner surface of the surge tank 40 toward the inner side of the surge tank 40.

Divided Structure

Referring to FIG. 1, the intake manifold 10 includes pieces made of resin. Specifically, the intake manifold 10 includes a first piece 11, a second piece 12, and a third piece 13.

The first piece 11 forms an part of the intake pipe 30, a part of the surge tank 40, and a part of each branch pipe 50. The first piece 11 includes the inlet port 32 and the introduction hole 71. The first piece 11 further includes the groove 41. The introduction hole 71 of the first piece 11 opens at a bottom surface of the groove 41.

Further, the first piece 11 includes a first flange 11F fixed to the second piece 12. The first flange 11F extends along the outer edge of the surge tank 40 and the outer edges of the branch pipes 50 in the first piece 11.

The second piece 12 forms a part of the intake pipe 30, a part of the surge tank 40, and a part of each branch pipe 50. The second piece 12 is fixed to face the first piece 11 to define an internal space of the surge tank 40 together with the first piece 11. The second piece 12 includes a second flange 12F fixed to the first flange 11F of the first piece 11.

The second flange 12F extends along the outer edge of the surge tank 40 and the outer edges of the branch pipes 50 in the second piece 12. When the second flange 12F is welded to the first flange 11F, the second piece 12 is fixed to the first piece 11.

The third piece 13 forms a part of each branch pipe 50. The third piece 13 is located on a side opposite to the second piece 12 from the first piece 11. The third piece 13 is fixed to face the first piece 11. In this state, the third piece 13 defines a downstream portion of the internal space of each branch pipe 50 together with the first piece 11. The third piece 13 is shaped such that the introduction hole 71 is not closed.

The cover 72 is located between the first piece 11 and the second piece 12. A part of the cover 72 is sandwiched between the first flange 11F and the second flange 12F. Specifically, as shown in FIG. 3, the opposite ends of the cover 72 in the longitudinal direction are sandwiched between the first flange 11F and the second flange 12F. Thus, the cover 72 is fixed to the first piece 11 and the second piece 12. When the first piece 11 is thermally welded to the second piece 12, a part of the cover 72 may be thermally welded together.

A portion of the cover 72 that is not sandwiched between the first piece 11 and the second piece 12 is not, for example, bonded to the first piece 11 or the second piece 12. Thus, as shown in FIG. 4, a slight gap G is provided between the cover 72 and the edge of the groove 41. That is, the gas passage GR is a space that is not completely sealed. Thus, the blow-by gas that has entered the gas passage GR through the introduction hole 71 flows out of the gas passage GR through the gap G between the cover 72 and the groove 41. In FIG. 4, the gap G between the cover 72 and the edge of the groove 41 is shown in an exaggerated manner.

Operation of Embodiment

The blow-by gas generated as the internal combustion engine is driven reaches the introduction hole 71 of the surge tank 40 from the inside of the crankcase through the blow-by gas passage. The blow-by gas that has reached the introduction hole 71 flows through the gas passage GR defined by the cover 72 and the inner surface of the groove 41. When flowing to the downstream side, the blow-by gas flowing through the gas passage GR gradually flows to the outside of the gas passage GR through the gap G.

Advantages of Embodiment (1) The cover 72 is fixed by being sandwiched between the first flange 11F and the second flange 12F. This eliminates the need to forcibly mold the cover 72 integrally with the first piece 11 or the second piece 12. Thus, the arrangement of the cover 72 reduces the possibility that limits are imposed on designing the shape of each piece. When the first flange 11F and the second flange 12F are fixed to each other, the cover 72 is also fixed to each piece. Thus, a complicated process is not required for fixing the cover 72.

(2) The gas passage GR is defined by the inner surface of the groove 41 of the surge tank 40 and the cover 72. A dimension by which the cover 72 protrudes from the inner surface of the first piece 11 is reduced by an amount by which the groove 41 is recessed. In particular, in the above embodiment, the cover 72 is substantially flush with the portion of the inner surface of the surge tank 40 other than the groove 41. Thus, the cover 72 is unlikely to obstruct the flow of intake air in the surge tank 40.

(3) The portion of the cover 72 that is not sandwiched between the first piece 11 and the second piece 12 is not, for example, bonded to the first piece 11 or the second piece 12. Thus, the blow-by gas flowing through the gas passage GR flows to the outside of the gas passage GR not from a specific portion of the gas passage GR but from a relatively wide range of the gas passage GR through the gap G. This allows the blow-by gas to be guided to a relatively wide range in the surge tank 40.

Modifications

The above embodiment may be modified as follows. The above embodiment and the following modifications can be combined as long as the combined modifications remain technically consistent with each other.

Figure 5:
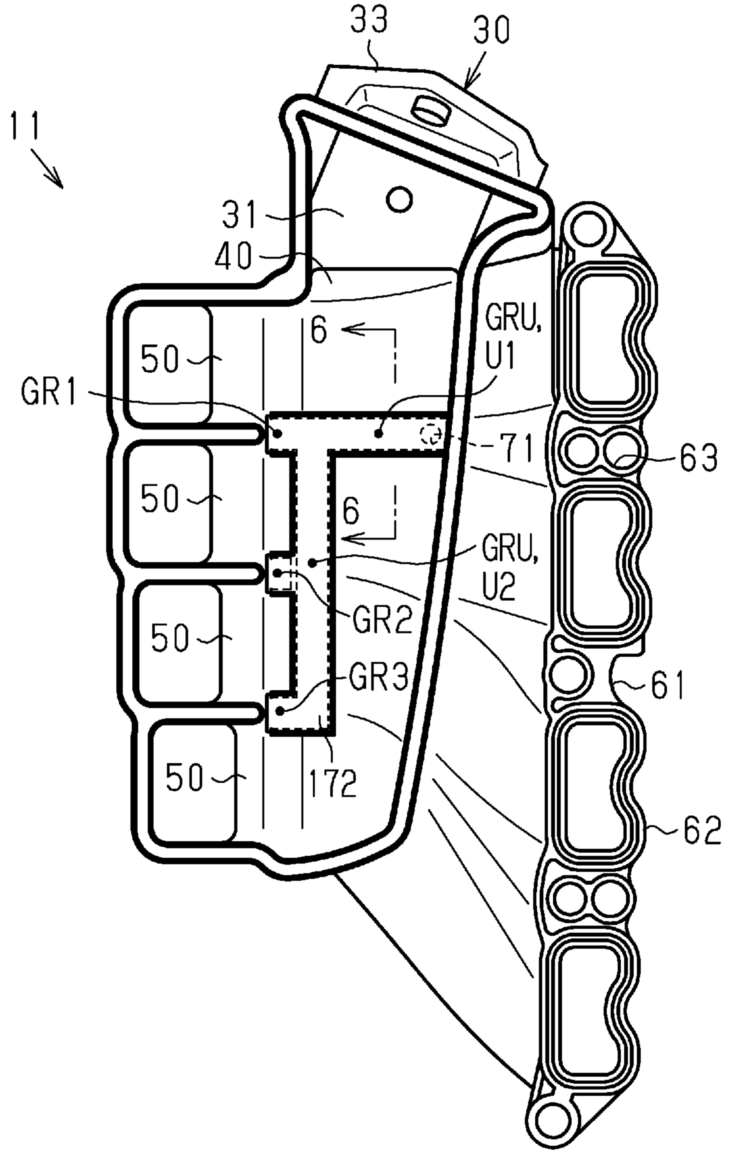
FIG. 5 is a plan view showing the first piece and the cover according to a modification.

The shape of the gas passage GR is not limited to the example of the above embodiment. In the example shown in FIG. 5, the gas passage GR is branched into passages. Specifically, the gas passage GR includes an upstream passage GRU including the introduction hole 71, a first branch passage GR1 branched from the upstream passage GRU, a second branch passage GR2 branched from the upstream passage GRU, and a third branch passage GR3 branched from the upstream passage GRU. The entire upstream passage GRU extends in an L shape. Specifically, the upstream passage GRU includes a first portion U1 and a second portion U2. The first portion U1 includes the introduction hole 71 and extends in a direction orthogonal to a first axis along which the branch pipes 50 are arranged. The second portion U2 is connected to an end of the first portion U1 closer to the branch pipe 50. The second portion U2 extends along the first axis. The first branch passage GR1 to the third branch passage GR3 are all connected to the second portion U2. The first branch passage GR1 to the third branch passage GR3 extend from the second portion U2 in the direction orthogonal to the first axis. The first branch passage GR1 to the third branch passage GR3 are arranged at equal intervals in the direction along the first axis. In this modification, the blow-by gas flowing into the gas passage GR from the introduction hole 71 is distributed in the direction along the first axis by the branch passages. Thus, the blow-by gas flowing into each branch pipe 50 is uniform. The number of the branch passages is not limited to three.

Figure 6:
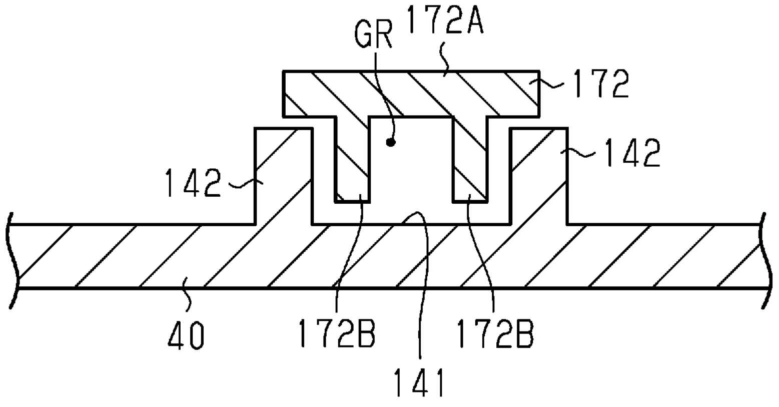
FIG. 6 is a partial cross-sectional view showing the intake manifold taken along line 6-6 of FIG. 5.

Further, as in the example shown in FIG. 6, the gas passage GR may be defined by walls 142 protruding from the inner surface of the surge tank 40 and a cover 172. In other words, a groove 141 is not recessed in the inner surface of the surge tank 40, but a space is defined by the walls 142 facing each other. The cover 172 includes a cover main body 172A and two walls 172B protruding from the cover main body 172A. The two walls 172B are located between the two facing walls 142. Thus, the gas passage GR has a labyrinthine structure in which the two walls 142 and the two walls 172B are fitted to each other.

Figure 7:
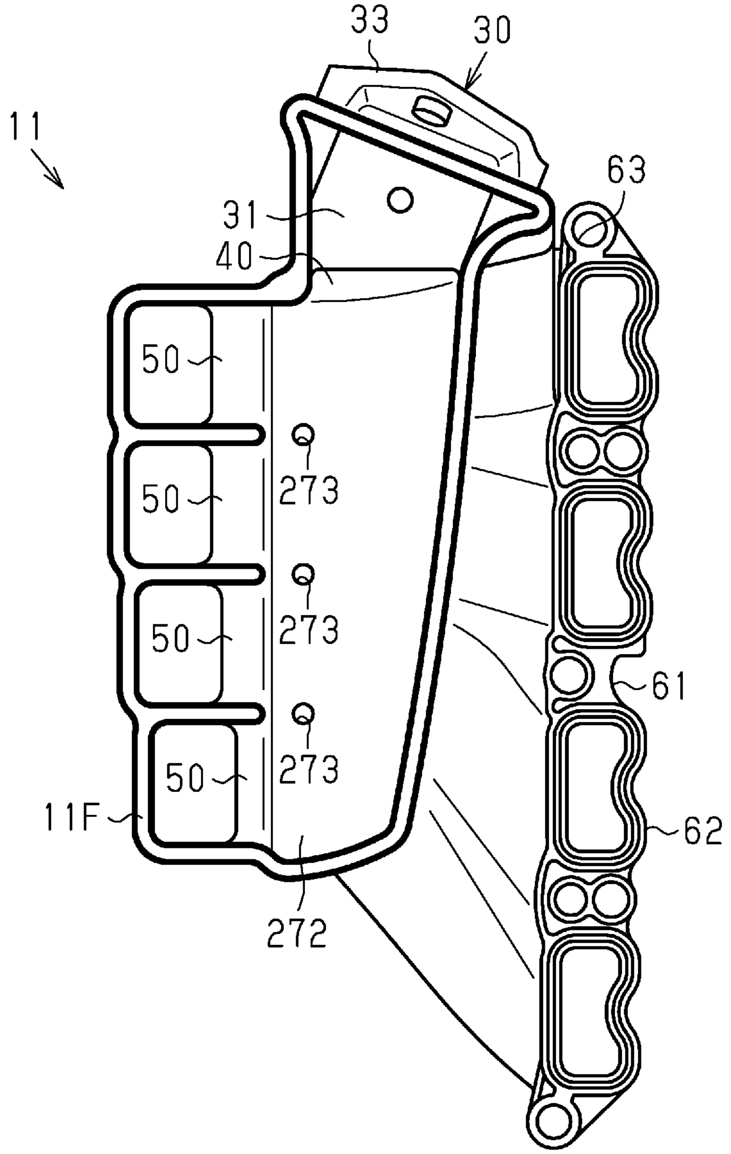
FIG. 7 is a plan view showing the first piece and the cover according to a modification.

Further, the gas passage GR does not have to be a space extending straight. In the example shown in FIG. 7, a flat cover 272 covers substantially the entire portion of the first piece 11 in the inner surface of the surge tank 40. Further, the cover 272 includes outlet holes 273 out of which the blow-by gas is discharged from the gas passage GR. When the cover 272 covers a sufficiently wide range in this manner, the arrangement of the outlet holes 273 facilitates the flow of the blow-by gas.

The number of the branch pipes 50 is not limited to four. In correspondence with the number of cylinders of the internal combustion engine to which the intake manifold 10 is coupled, there may be three or less branch pipes 50 or may be five or more branch pipes 50.

The shape of the downstream flange 61 is not limited to the example of the above embodiment, and may be changed in correspondence with the shape of the internal combustion engine to which the intake manifold 10 is coupled.

The shape of the cover 72 is not limited to the example of the above embodiment (i.e., plate shape). The cover 72 only needs to define the gas passage GR together with the inner surface of the surge tank 40. Thus, the cover 72 may face the inner surface of the second piece 12 to define the gas passage GR.

The shape of the intake manifold 10 is not limited to that of the present embodiment. For example, the branch pipes 50 may open in the same direction as the inlet port 32. In addition, the branch pipes 50 may have a straight shape without being curved.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An intake manifold, comprising: a surge tank that is a part of an intake passage; and branch pipes branched from the surge tank and respectively connected to intake ports of an internal combustion engine, wherein the intake manifold comprises: a first piece made of resin, forming a part of the surge tank; a second piece made of resin, forming the surge tank together with the first piece; and a cover made of resin and located inside the surge tank, the first piece includes: an inlet port through which intake air is introduced into the surge tank; an introduction hole through which blow-by gas is introduced; and a first flange fixed to the second piece, the second piece includes a second flange fixed to the first flange, the cover defines, together with an inner surface of the surge tank, a gas passage extending from the introduction hole into the branch pipe, a part of the cover is sandwiched between the first flange and the second flange, and wherein the cover is not bonded to the surge tank except for a portion sandwiched between the first flange and the second flange.

2. The intake manifold according to claim 1, wherein the first piece includes a groove recessed on a side opposite to an internal space of the surge tank, and the cover faces the groove.

* * * * *